(No Model.)　　　　　　　　　　　　　　　　　　　2 Sheets—Sheet 1.
C. A. KER.
METHOD OF PRODUCING MUSIC OR LIKE ENGRAVINGS.
No. 482,871.　　　　　　　　　　Patented Sept. 20, 1892.

(No Model.) 2 Sheets—Sheet 2.

C. A. KER.
METHOD OF PRODUCING MUSIC OR LIKE ENGRAVINGS.

No. 482,871. Patented Sept. 20, 1892.

Witnesses:

Inventor:
Charles Alison Ker
By H A de Vos
Attorney

UNITED STATES PATENT OFFICE.

CHARLES ALISON KER, OF GLASGOW, SCOTLAND.

METHOD OF PRODUCING MUSIC OR LIKE ENGRAVINGS.

SPECIFICATION forming part of Letters Patent No. 482,871, dated September 20, 1892.

Application filed February 10, 1892. Serial No. 420,934. (No model.) Patented in England June 6, 1889, No. 9,407.

*To all whom it may concern:*

Be it known that I, CHARLES ALISON KER, a subject of the Queen of Great Britain, and a resident of the city of Glasgow, Scotland, have invented certain new and useful Improvements in Methods of Producing Music or Like Engravings, (for which I obtained a patent in Great Britain, dated June 6, 1889, No. 9,407,) of which the following is a specification.

This invention has for its object to simplify and cheapen the production of music and like engravings.

Instead of as at present engraving the music or the like directly onto a sheet of white metal by hand-tools, which requires highly-skilled labor and is expensive, I first punch, stamp, or cut out the musical or other signs or characters upon a sheet of metal, preferably thin sheet zinc or copper or upon card-board or its equivalent. From the pattern-sheet thus formed the signs or characters are traced by a pantograph engraving-machine onto another sheet of steel, copper, zinc, or other suitable metal. From this latter engraved sheet the impressions are taken. The signs or characters upon the pattern-sheet are preferably punched of such a size and to such a depth as shall enable them to be traced with ease and accuracy.

When the impressions made on the pattern-sheet are larger than the impressions desired to be produced on the engraved plate, the pantograph-machine can be arranged to reduce them to the proper size.

In order that my said invention may be properly understood, I have hereunto appended an explanatory sheet of drawings, whereon—

Figure 1:
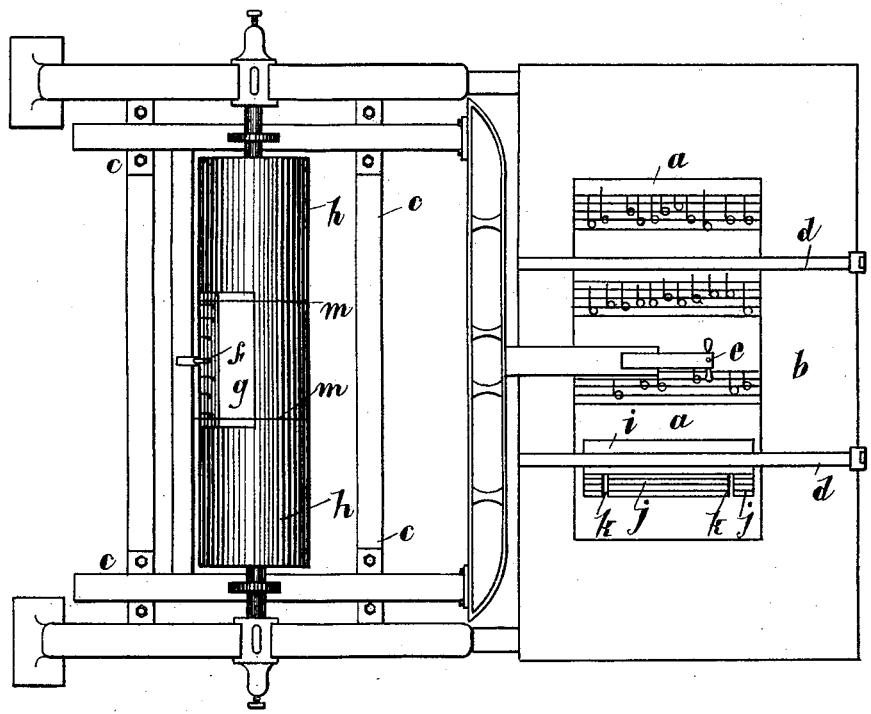
Figure 2:
Figure 3:
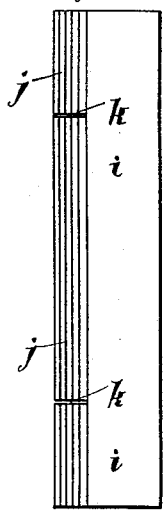
Figure 4:
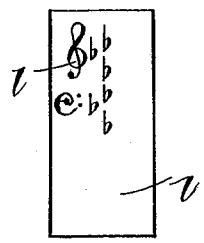

Figure 1 is a plan view of a pantograph engraving-machine, showing a sheet of music as being engraved. Fig. 2 is a representation of a pattern-sheet. Fig. 3 is a representation of a pattern-sheet for ruling lines. Fig. 4 is a representation of a pattern-sheet for clefs.

When it is desired to engrave a sheet of music in accordance with my invention, instead of as at present engraving the sheet by hand I first rule lines forming a staff upon a sheet $a$ of metal, card-board, or equivalent material, and on or in the spaces between or on leger-lines above or below the staff I stamp or impress by means of punches or dies the several notes, rests, and other music-signs forming the piece of music. The sheet $a$, which I term a "pattern-sheet," is now laid on the table $b$ of the engraving-machine $c$. The sheet $a$ is held in position on the table by the straps $d$. The pointer or tracer $e$ of the machine is now drawn over the several notes, marks, and other characters forming the piece of music, and so causes the diamond engraver $f$ of the machine to cut the same notes on the sheet of metal $g$, secured to the roller $h$ of the machine. From the engraved sheet $g$ the impressions are taken.

The notes, rests, and other characters forming the piece of music are preferably punched to a large scale on the pattern-sheet $a$, as shown, so that they can be easily traced. The notes reproduced on the engraving-plate $g$ are preferably reduced to a much smaller scale than those on the sheet $a$, so that the impressions taken will have a neat and well-finished appearance.

In order to insure that the lines of the engraved sheet $g$ are perfectly straight, they may, instead of being traced from the sheet $a$, be traced from a staff or stave plate $i$, Fig. 3, which is simply a piece of zinc or other metal drawn or cut with grooves $j$, forming lines at one side. When it is desired to engrave the lines forming each stave of the piece of music, the plate $i$ is placed on the table over the place where the stave should be drawn and secured in position by a strap $d$, as shown at Fig. 1. The tracer $e$ is now drawn down the grooves $j$. As the grooves $j$ are cut pretty deeply into the plate $i$, the tracer $e$, if drawn along with ordinary care, never deviates from them. In order to make sure that the lines are being traced correctly, slits or openings $k$ are made in the plate. When the pointer comes to one of these openings, the operator can at once tell if the lines are being drawn properly or not, for if the pointer is not running in a straight line it will not run into the groove at the opposite side of opening.

Clefs, rests, and other music-signs may, if desired, be cut or punched on pattern-plates, such as $l$, Fig. 4. When it is desired to produce clefs or other signs on the engraved plate g, the pattern-plates may be placed on top of the sheet a, over the place where the rest or other mark is to appear, and the tracer is then drawn over it, and consequently the diamond engraver f engraves the mark or sign on the plate g.

The sheets a are perfectly cut or stamped with music sufficient for a single page of the printed copy, although they may be cut or stamped with music sufficient for a folio or for other number of pages.

In the case of solid-headed notes, such as crotchets, quavers, and other characters, the sheets a are preferably cut or stamped with only the outlines of the notes, as shown at Fig. 2, and to fill up the notes and other characters the engraved sheets g, which are preferably varnished, are subject to the usual acid process. The sheets g are or may be secured to the roller h of the engraving-machine by strings or straps m.

The pattern-sheets a may be of any suitable material; but I prefer to use pieces of zinc or sheets of card-board, as the notes can be easily punched, cut, or otherwise made on them. The notes and other marks are punched on the pattern-sheet to such a depth that the notes can be easily and accurately traced by the pointer e.

Music engraved in accordance with my invention has a better finish and appearance than the generality of hand-work, while it can be done at a much cheaper rate.

If desired, the invention may be used for producing engravings of a like nature to music.

Although I have shown in part an engraving-machine, it is to be understood I make no claim thereto, nor do I confine myself to the use of a machine of that special construction.

Having now particularly described and ascertained the nature of my said invention and in what manner the same is to be performed, I declare that what I claim is—

1. The within-described method for engraving music or the like, consisting in punching or otherwise cutting out the musical or other sign upon a pattern-sheet of suitable material, then placing said sheet upon a table in an engraving-machine, then securing a sheet of suitable material upon a roller, then transferring the characters from the first sheet to the second sheet by means of a pantograph, and then removing the sheet from the roller and printing from said sheet, substantially as and for the purposes described.

2. In a machine for engraving music or the like, the combination, with a table for holding a pattern-sheet, of a roller for holding a sheet upon which the characters are to be transferred from the pattern-sheet upon the table, a transfer-sheet placed upon said roller, and means, substantially as described, for holding said transfer-sheet upon said roller while a pantograph is caused to transfer the characters from the pattern-sheet to said transfer-sheet upon said roller, said holding means permitting the transfer-sheet to be placed upon and removed from said roller, substantially as and for the purposes described.

In witness whereof I have hereunto signed my name, at Glasgow, Scotland, this 4th day of December, 1891.

CHARLES ALISON KER.

Witnesses:
H. D. FITZPATRICK,
WILLIAM FLEMING.